No. 667,581. Patented Feb. 5, 1901.
J. A. RUSSELL.
LEMON SQUEEZER.
(Application filed Sept. 29, 1900.)
(No Model.)
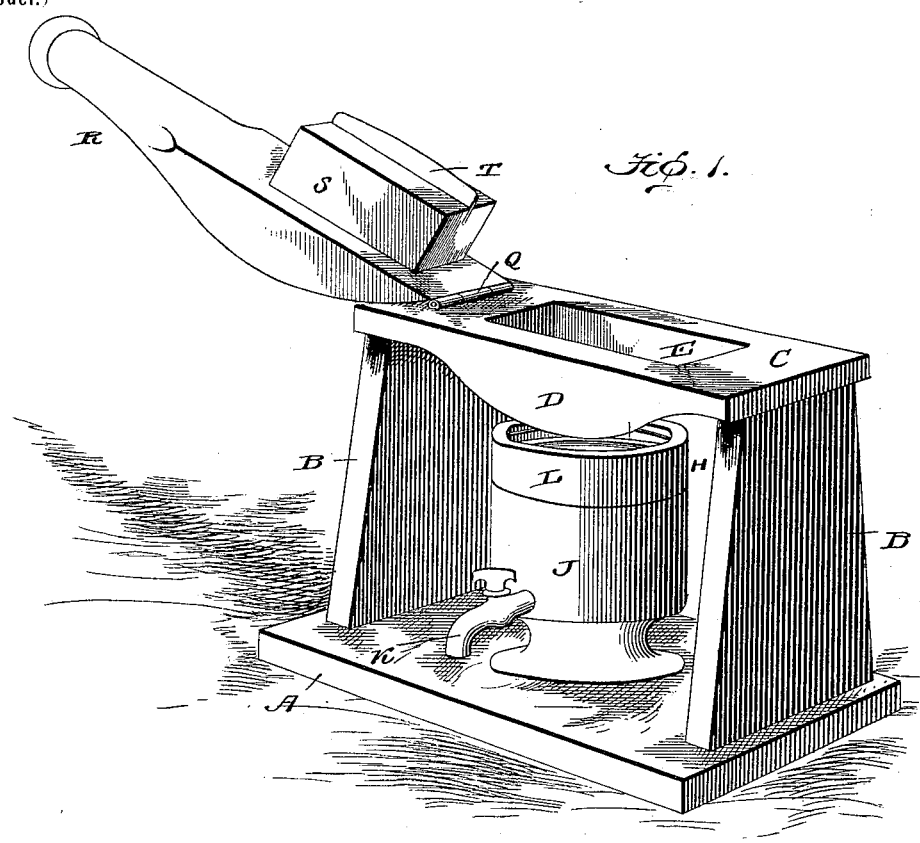
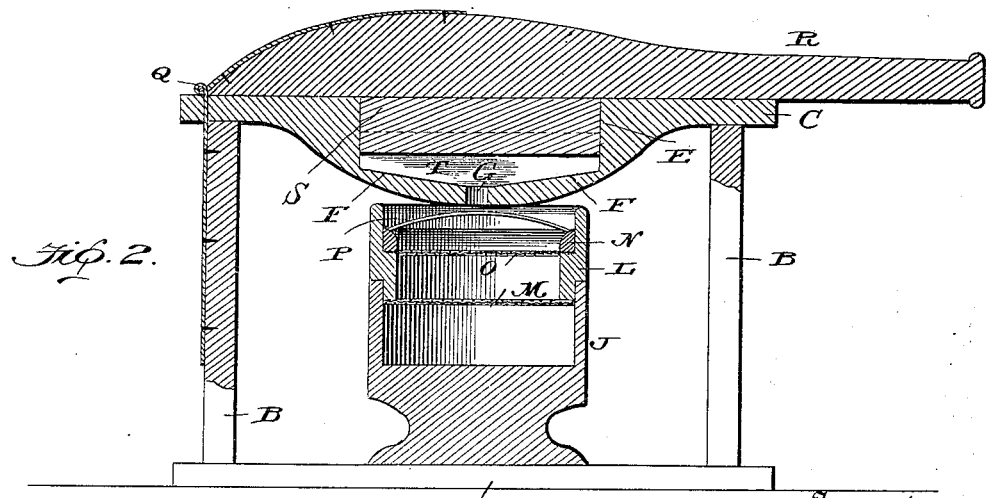
Witnesses
Inventor
John A. Russell.
By David P. Moore.
Attorney

UNITED STATES PATENT OFFICE.

JOHN ANDREW RUSSELL, OF KEY WEST, FLORIDA.

LEMON-SQUEEZER.

SPECIFICATION forming part of Letters Patent No. 667,581, dated February 5, 1901.

Application filed September 29, 1900. Serial No. 31,500. (No model.)

*To all whom it may concern:*

Be it known that I, JOHN ANDREW RUSSELL, a citizen of the United States of America, residing at the city of Key West, in the county of Monroe and State of Florida, have invented a new and useful Lime, Lemon, Orange, and Pineapple Squeezing Machine, of which the following is a specification.

My invention relates to improvements in lemon-squeezing machines; and the main object of my invention is the provision of a machine for receiving the whole fruit and cutting and pressing the same, straining the seed from the same, and re-straining the juice as it flows from the seed and coarse-pulp strainer.

Another object of my invention is the provision of a simple, durable, and inexpensive machine, which is very useful and practical.

To attain the desired objects, my invention consists of a lemon-squeezing machine embodying novel features of construction and combination of parts, substantially as disclosed herein.

In the drawings, Figure 1 is a perspective view of the entire machine, and Fig. 2 is a longitudinal central sectional view thereof.

Referring by letter to the drawings, A designates a base upon which are secured the legs or standards B supporting the table C, which is provided with the enlarged depending portion D, having a well or receptacle E formed in the body thereof. Running the full length of the bottom of the well are the inclined channels F, which act as a guard for the knife-blade, to be hereinafter fully described, and which terminate in the outlet port or opening G, which is directly above and allows the juice to flow into the juice-receptacle H, which consists of the hollow base J, provided with the outlet-port guarded by the spigot or cock K. Fitting into and removable from this hollow base is the circular juice-strainer frame L, which is provided with the strainer M, and has resting upon the circular shoulder upon the interior of the frame the annular ring N, carrying the strainer O, said ring having a bail or handle P in order that it may be removed when it is necessary to clean the same. Secured to one of the legs is one member of the hinge Q, which has its other member secured to the hand-lever R, upon whose lower side is secured a presser-block S, carrying a cutting blade or knife T, said block and blade being adapted to fit in the well and channels, as shown in Fig. 2.

From this description the operation of my machine is readily understood, but, briefly stated, it is as follows: The whole fruit or number of fruit is placed into the well, when the hand-lever is pressed down, causing the block and blade to enter the well and cut and press the fruit. The juice, with the seed and pulp, flows from the well into the receptacle after having been strained by the two strainers, the spigot allowing the strained juice to be drawn from the hollow base when needed.

It is evident that I provide a simple, durable, and cheap press or squeezer for lemons and other fruit and one which is very useful and practical when a great amount of juice is desired, as the machine can be made to have any capacity whatsoever and receives the fruit without being cut or sliced or softened.

I claim—

A lemon-squeezing machine, comprising a receptacle or well for the lemons, means to cut and press the same, and a juice-receptacle mounted below the lemon-receptacle and consisting of a hollow base having a spigot, a circular frame mounted in the top of the hollow base and carrying a strainer, and a removable strainer mounted in the upper portion of the circular frame to receive the seed and the coarser portion of the pulp while the lower strainer clears the juice of fine particles.

In testimony whereof I have signed my name to this specification in the presence of two subscribing witnesses.

JOHN ANDREW RUSSELL.

Witnesses:
J. VINING HARRIS,
E. S. PINDER.